(12) United States Patent
Akkermans et al.

(10) Patent No.: US 6,218,800 B1
(45) Date of Patent: Apr. 17, 2001

(54) CONTROL SYSTEM, DRIVING SYSTEM AND CONTROL METHOD, APPARATUS INCLUDING THE DRIVING SYSTEM

(75) Inventors: Antonius H. M. Akkermans; Cornelius A. Hezemans, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/357,271

(22) Filed: Jul. 20, 1999

(30) Foreign Application Priority Data

Jul. 21, 1998 (EP) .................................................. 98202445

(51) Int. Cl.$^7$ ..................................................... G08J 11/01
(52) U.S. Cl. ........................ 318/560; 318/561; 318/600; 318/601; 318/632
(58) Field of Search .................................... 318/560, 561, 318/569, 600, 601, 615, 616, 632

(56) References Cited

U.S. PATENT DOCUMENTS

| | | | |
|---|---|---|---|
| 4,330,880 | 5/1982 | Van Dijk | 369/32 |
| 5,321,676 | 6/1994 | Van Velthoven et al. | 369/32 |
| 5,636,193 | * 6/1997 | Ohmi | 369/53 |

FOREIGN PATENT DOCUMENTS

| | | |
|---|---|---|
| 0508522A2 | 10/1992 | (EP) . |
| WO/9723873 | 7/1997 | (WO) . |
| WO97/23873 | * 7/1997 | (WO) . |

* cited by examiner

*Primary Examiner*—Jeffrey Donels
*Assistant Examiner*—Rita Leykin
(74) *Attorney, Agent, or Firm*—Michael E. Belk

(57) ABSTRACT

A control system in accordance with the invention comprises error signal generating means for generating an error signal in response to a reference signal and a first and a second position signal. The reference signal is a measure of the desired value of a position of a first part of a drive system with respect to a second part of the drive system. The position signals are a measure of the actual value of said position. The error signal is a measure of the difference between the desired value and the actual value of the position. The control system further comprises energizing means for energizing a motor which is to be controlled by the control system in dependence on the error signal. The control system of the invention is characterized in that the error signal generating means are adapted to generate weighting factors from the reference signal, for weighting the position signals with the weighting factors and determining a sum of the weighted position signals. The control system can be used in a recording/playback device for positioning a read/write head.

12 Claims, 6 Drawing Sheets

CONTROL SYSTEM, DRIVING SYSTEM AND CONTROL METHOD, APPARATUS INCLUDING THE DRIVING SYSTEM

FIELD OF THE INVENTION

The invention relates to a control system for a motor driven system.

The invention also relates to a driving system including the control system.

The invention further relates to an apparatus for storing and/or reproducing information, which apparatus includes the driving system.

The invention further relates to a method of controlling a motor in driving system.

BACKGROUND OF THE INVENTION

Such a control method, driving system, apparatus and method are known from WO 97/23873 hereby incorporated in whole by reference. In the driving system described therein the first and the second position signal are each generated by a Hall sensor. Furthermore, an inverted position signal is derived from each of the position signals. By means of the two position signals and one of the inverted signals a status generator generates a status signal, which is applied to a multiplexer. The multiplexer also receives the two position signals and the two inverted position signals. Depending on the status signal the multiplexer transfers one of the inverted or non-inverted position signals to its output. The signal thus obtained on the output of the multiplexer is sawtooth-shaped. The reference means are adapted to compensate for abrupt changes in the output signal of the multiplexer by a corresponding variation of the reference signal. This results in a uniform drive of the motor.

SUMMARY OF THE INVENTION

It is an object of the invention to provide a control system, a driving system, a method and an apparatus for storing and/or re producing information of the types defined hereinbefore in which such a compensation is not required.

In accordance with the invention the position signals are used at the same time in order to calculate the error signal. This makes it possible to calculate an error signal which, regardless of the instantaneous value of the position, is always a monotonic function of the difference between the instantaneous value and the desired value of the position. As a result of this, compensation of the reference signal is not necessary.

BRIEF DESCRIPTION OF THE INVENTION

These and other aspects of the invention will be described in more detail with reference to the drawings. In the drawings:

FIG. 1 diagrammatically shows a driving system,

FIG. 2 diagrammatically shows error signal generating means,

DETAILED DESCRIPTION OF THE PREFERRED EMBODIMENTS

Figure 1:
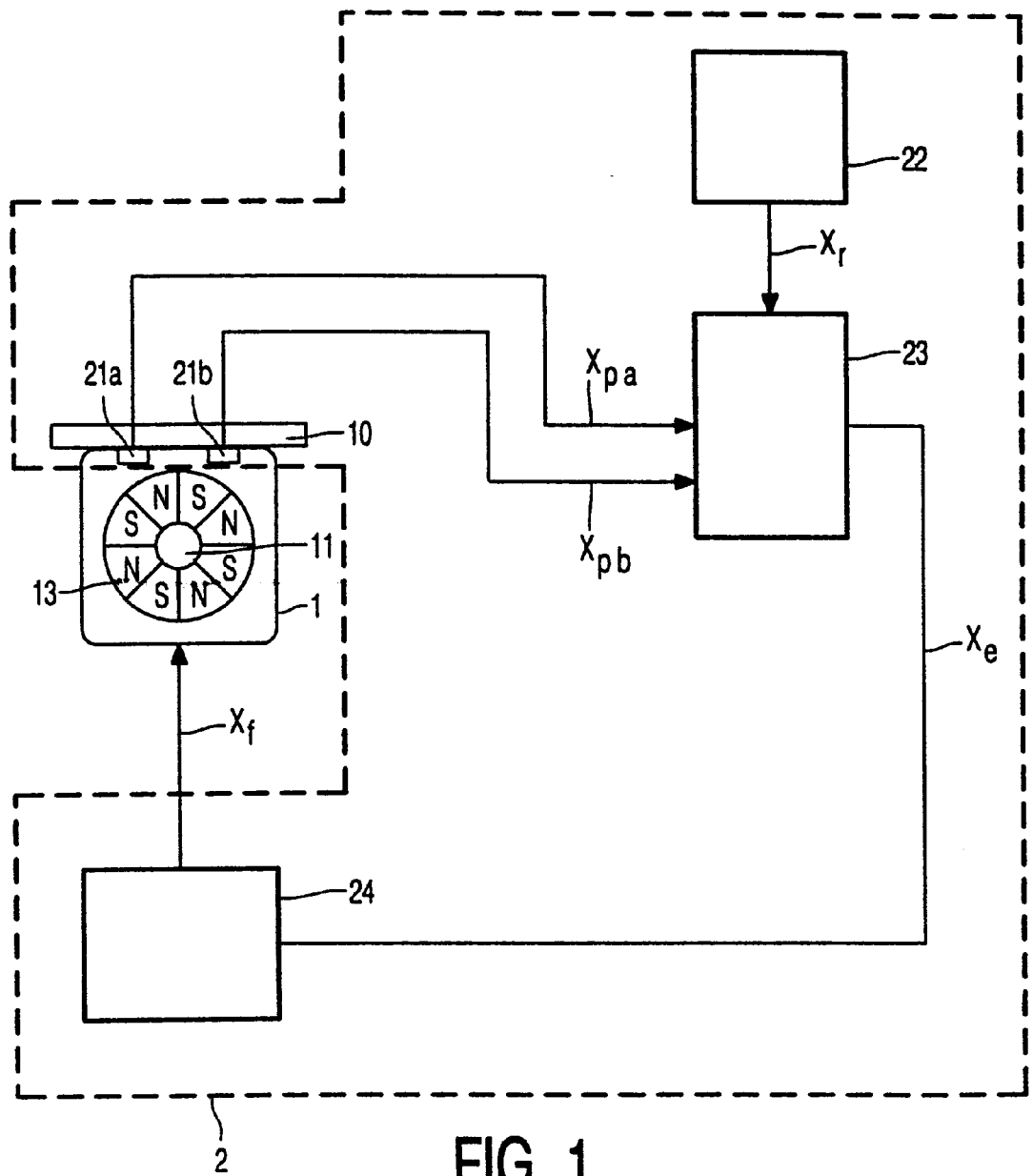

FIG. 1 shows diagrammatically a driving system which comprises a motor 1 and a control system 2 for the motor.

The motor is carried by a chassis which forms a first part and drives a second part formed by a shaft 11 with respect to the first part. For example, a reel for a magnetic or an optical tape, or a slide of a write/read head of an apparatus for reading or recording a disc-shaped data carrier, is mechanically coupled to the second part 11. The control means 2 include a measurement system 21a,b for generating a first and a second position signal Xpa, Xpb, which position signals are a measure of the instantaneous value of the position of the second part 11 with respect to the first part 10. In the present embodiment he motor 1 comprises a magnet ring 13 having nine magnetic pole pairs. The measurement system includes a first and a second Hall sensor 21a, 21b which are arranged in facing relationship with respect to the magnet ring and which generate the first and the second position signal, respectively. The position signals thus generated are periodic functions of the instantaneous value of the motor shaft angle $\alpha_p$. The first and the second position signal are $\sin(9*\alpha_p)$ and $\cos(9*\alpha_p)$. In another version the measurement system comprises a first and a second optical sensor and the shaft of the motor carries a disc whose transmission is a function of the angle. In yet another version the measurement system comprises a disc whose resistance in a radial direction varies as a function of the angle and the radial resistance is measured by means of a first slip contact at a central point on the disc and by means of two or more slip contacts at the periphery of the disc.

The control system further comprises reference means 22 for generating a reference signal Xr which is a measure of the desired position. If desired, the reference means 22 may generate one or more further reference signal for use by the error signal generating means 23. In the present case, the reference signal Xr is proportional to the value $9*\alpha_s$, where $\alpha_s$ is the desired value for the shaft of the motor 1. From the position signals Xpa, Xpb and the reference signal Xr the error signal generating means 23 derive an error signal Xe which is a measure of the difference between the desired value and the instantaneous value of the position. The control means 2 further comprise energizing means 24 for energizing the motor 1 with an energizing signal Xf in dependence on the error signal Xe.

Figure 2:
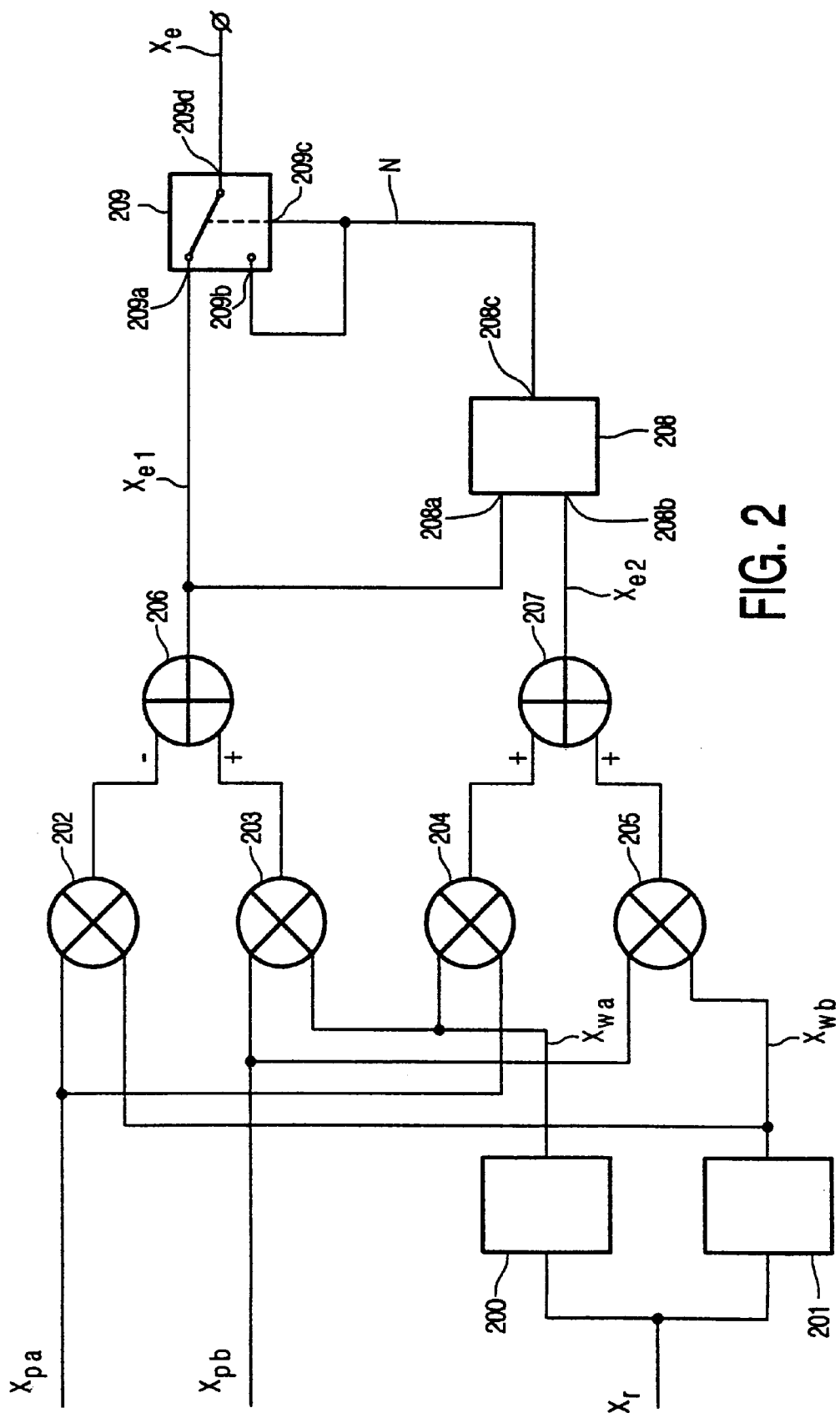

FIG. 2 shows that the error signal generating means are adapted to derive weighting factors Xwa, Xwb from the reference signal, for weighting the position signals Xpa, Xpb with the weighting factors Xwa, Xwb and for determining a sum of the weighted position signals. The weighting factors are periodic functions of the reference signal Xr. In a variant the periodic functions are derived from the reference signal, for example, by a series expansion. However, in the present variant the error signal generating means comprise a first table 200 which supplies, as a function of the reference signal Xr, in the present case a 7-bit digital signal, a first weighting factor Xwa corresponding to sin $\sin(9*\alpha_s)$. A second table 201 supplies, as a function of the reference signal Xr, a second weighting factor Xwb corresponding to $\cos(9*\alpha_s)$.

Figure 3:
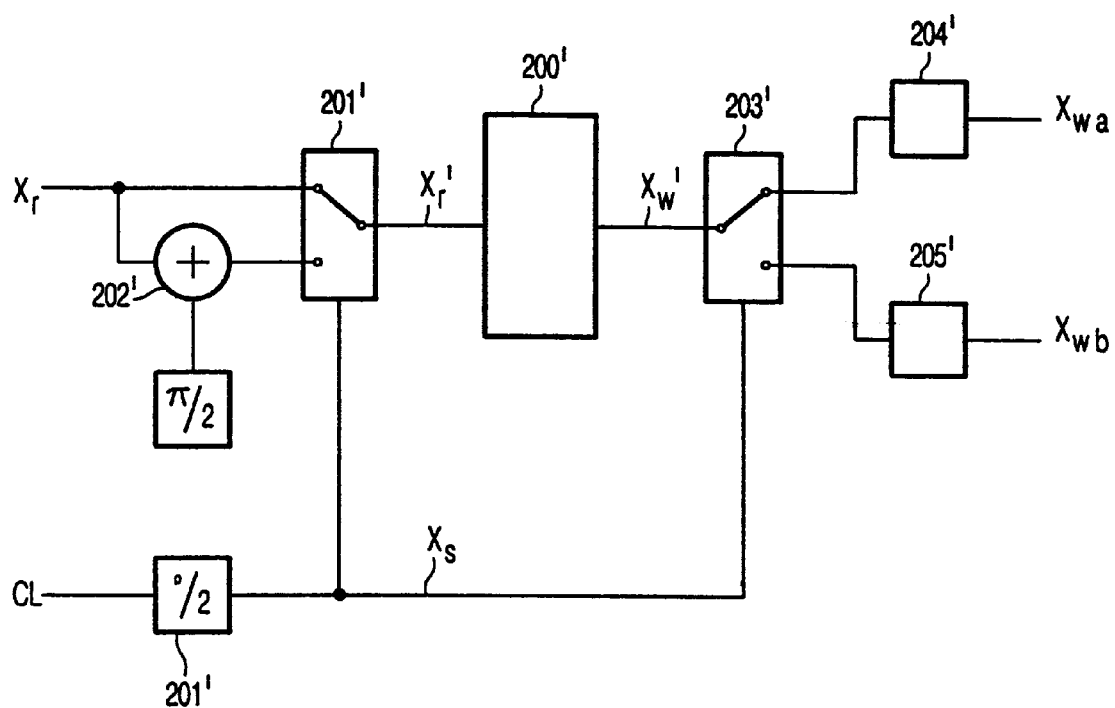
FIG. 3 shows a variant of a part of FIG. 2.

A variant shown in FIG. 3 uses a single table 200' for calculating both the first weighting factor Xwa and the second weighting factor Xwb. Said table 201' receives an output signal Xr" from a multiplexer 201'. This output signal Xr" has been selected by the multiplexer 201' from a first input signal Xr and a second input signal Xr' in dependence on a binary selection signal Xs. The first input signal Xr corresponds to the reference signal, which is a measure of the angle $9*\alpha_s$. The adder 202' calculates the second signal Xr', which is a measure of the angle $9*\alpha_s+\pi/2$, from the reference signal Xr. Depending on the value of the selection signal Xs the table 200' supplies an output signal Xw' corresponding to $\cos(9^*\alpha_s)$ or $\sin(9^*\alpha_s)$ and this signal Xw' is read into a first register 204' or into a second register 205' via a demultiplexer 203'. In the present variant the selection signal Xs is generated from the clock signal C1 by means of a divider 206'. The value of the selection signal Xs changes every period of the clock signal.

The error signal generating means 23 shown in FIG. 2 comprise a first multiplier 202 which receives the first position signals Xpa at its first input and which multiplies this signal by the second weighting factor Wxb applied to its second input by the second table 201. A second multiplier 203 receives the second position signal Xpb at its first input and the first weighting factor Xwa from the output of the first table 201 at its other input. The first multiplier 202 has an output connected to an inverting first input and the second multiplier 203 has an output connected to a second non-inverting input of a first adder.

The operation of the error signal generating means will now be explained with reference to FIGS. 4A to 4D.

Figure 4A:
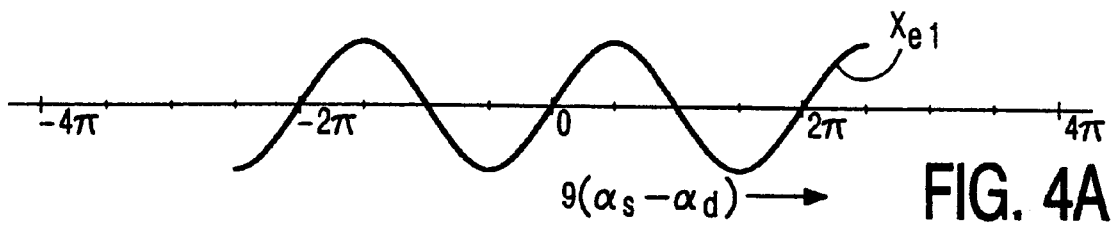
FIGS. 4A to 4D show signals appearing in the error signal generating means of FIG. 2.

The signal Xe1 supplied by the adder 206 is proportional to $\sin(9^*(-\alpha_s-\alpha_d))$. This signal, shown in FIG. 4A, is suited as an error signal provided that the value of the angle $9^*(-\alpha_s-\alpha_d)$ remains within an interval from $-\pi/2$ to $+\pi/2$.

Figure 4B:
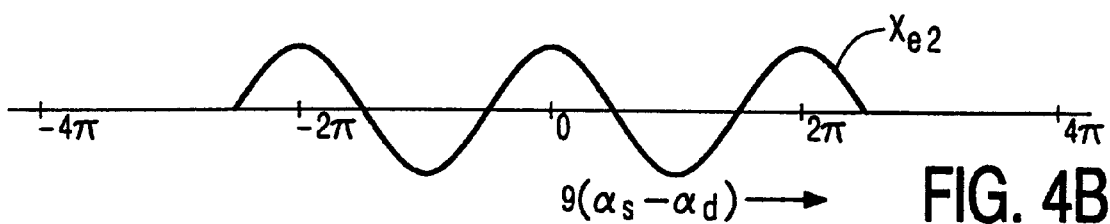
Figure 4C:
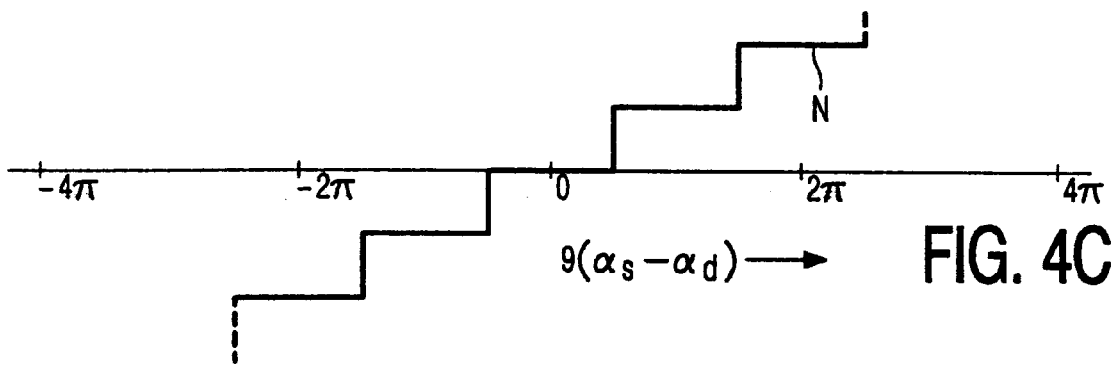

In order to enable also larger deviations between the desired angle and the instantaneous angle to be corrected a second weighted sum Xe2 is determined, which is a measure of $\cos(9^*(-\alpha_s-\alpha_d))$. Consequently, Xe1 and Xe2 are periodic functions of the difference between the instantaneous value of the angle and the desired value of the angle, which are shifted in phase relative to one another. This signal is shown in FIG. 4B. For this purpose, a third multiplier 204 receives the first position signal Xpa at its first input and the first weighting factor Xwa at its second input. A fourth multiplier 205 receives the second position signal Xpb at its first input and the second weighting factor Xwb at its second input. The third multiplier and the fourth multiplier each have an output connected to, respectively, a first and a second input (both non-non-inverting) of a second adder 207. The signal Xe2 is proportional to $\cos(9^*(-\alpha_s-\alpha_d))$. Each of the adders 206, 207 has an output connected to a respective input of a counting unit 208.

Figure 5:
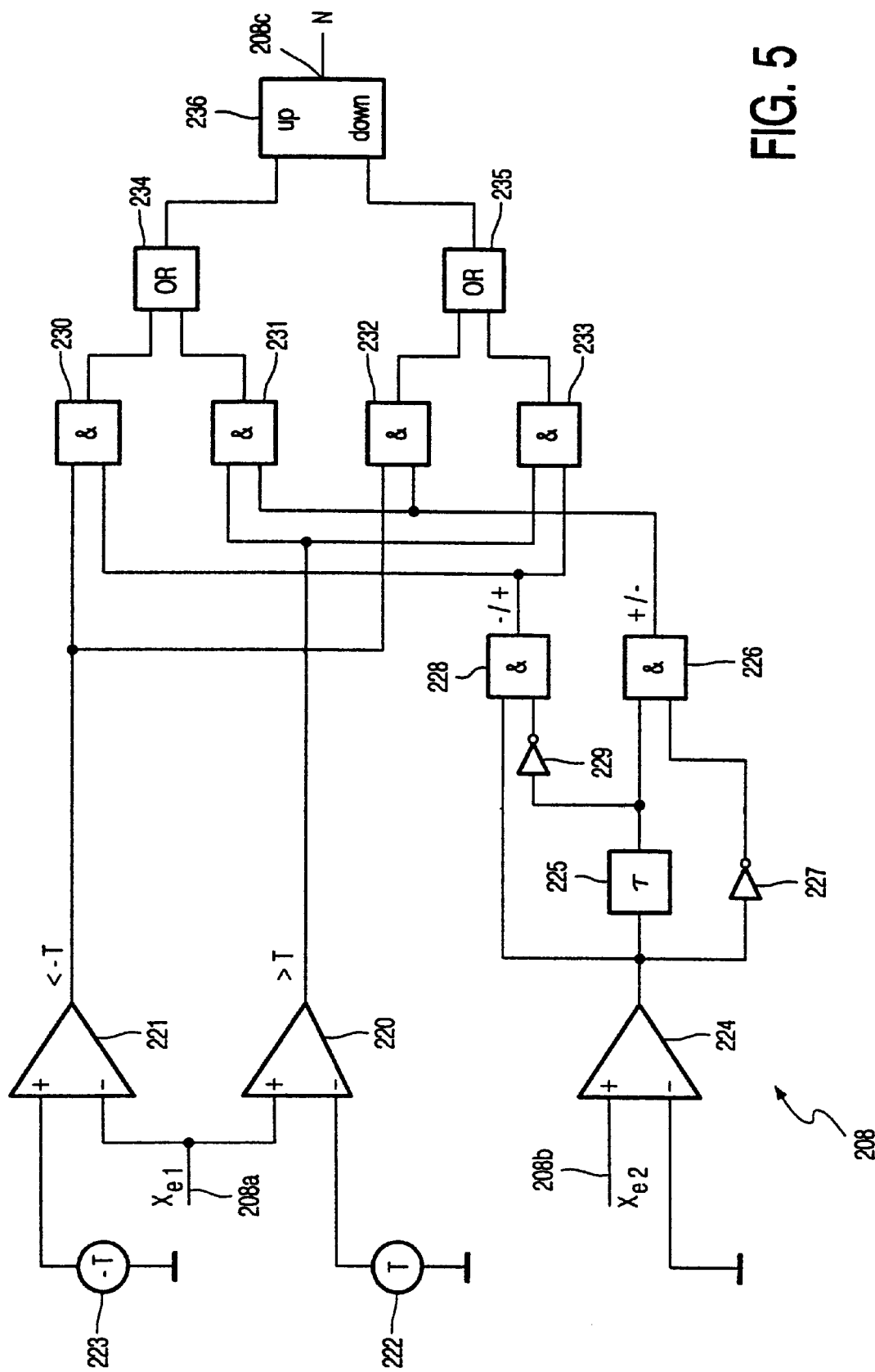
FIG. 5 shows a part of FIG. 2.

The counting unit 208, which is shown in more detail in FIG. 5, determines the nearest integral value N of $9^*(-\alpha_s-\alpha_d)/\pi$ (see FIG. 4C) from the first weighted sum Xe1 and the second weighted sum Xe2. The value N is incremented if for a value of the first sum Xe1 higher than a positive first threshold value T the sign of the second sum Xe2 changes from positive to negative, or if for a value of the first sum Xe1 lower than a negative second threshold value –T the sign of the second sum Xe2 changes from negative to positive. The value N is decremented if for a value of the first sum Xe1 higher than a positive first threshold value T the sign of the second sum Xe2 changes from negative to positive, or if for a value of the first sum Xe1 lower than a negative second threshold value –T the sign of the second sum Xe2 changes from positive to negative.

The value N is equal to $\text{trunc}(9^*(-\alpha_p-\alpha_s)/\pi)$, where trunc(x) is the rounded-up value of x. The value of N is consequently a measure of the number of periods corresponding to the deviation between the instantaneous angle $\alpha_p$ and the desired angle $\alpha_s$.

Figure 4D:
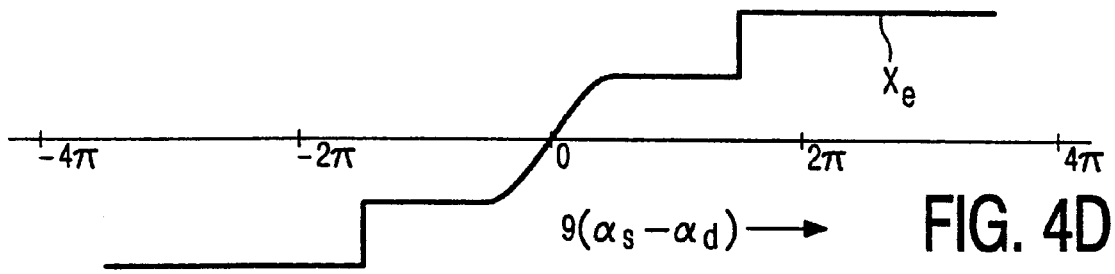

The output of the first counter 206 is further connected to a first input 209a of a multiplexer 209. A second input 209b of the multiplexer 209 is connected to the output of the counting unit 208. The output of the counting unit 208 is connected to a selection input 209c of the multiplexer 209. The generated error signal Xe is supplied to the output of the multiplexer 209. The multiplexer 209 has its output coupled to its first input 209a when the value of the signal N at the selection input 209c corresponds to a value 0. The multiplexer 209 has its output coupled to its second input 209b when the value of the signal N at the selection input 209c differs from 0. The signal Xe at the output of the multiplexer 209 is shown in FIG. 4D. In the case of a comparatively small difference between the instantaneous position $\alpha_p$ and the desired position $\alpha_s$, i.e. $-\pi/2 <= 9^*(-\alpha_s-\alpha_d) <= \pi/2$, the error signal generating means 23 generate an error signal Xe which is equal to $\sin(9^*(-\alpha_s-\alpha_d))$. In the case of a comparatively large difference, i.e. for an absolute value of $(9^*(-\alpha_s-\alpha_d)) > \pi/2$, the error signal is equal to $\text{trunc}(9^*(-\alpha_s-\alpha_d))/\pi$. The quantization of the error signal Xe generated by the error signal generating means 23 is therefore finer in the case of a comparatively small difference than in the case of a comparatively large difference between the instantaneous position ($\alpha_p$) and the desired position ($\alpha_s$). This makes it possible to obtain an accurate positioning, while yet the total number of quantization levels can be limited.

For an absolute value of the difference larger than $3\pi/2$ the error signal Xs is independent of the difference. Moreover, the error signal generating means 23 generate an error signal Xe which in the case of a comparatively small difference between the instantaneous position $\alpha_p$ and the desired position $\alpha_s$ exhibits a comparatively large variation with respect to the variation of the difference in the case of a comparatively large difference.

The counting unit shown in FIG. 5 has a first input 208a for receiving the first sum Xe1 and a second input 208b for receiving the second sum Xe2. The first input Xe1 is connected to a non-inverting input of a first comparator 220 and to an inverting input of a second comparator 221. An inverting input of the first comparator 220 is further connected to a first bias voltage source 222, which supplies a voltage which is a measure of the positive threshold value T. The second comparator 221 has a non-inverting input connected to a second bias voltage source 223 which supplies a voltage which is a measure of the negative threshold value –T. The second input 208b of the counting unit 208 is connected to a non-inverting input of a third comparator 224. The latter has its inverting input connected to ground. The third comparator 224 has its output connected to an input of a delay element 225. The delay element 225 has an output connected to a first input of an AND gate 226. The third comparator 224 has its output also connected to an input of an inverter 227. The inverter 227 has an output connected to a second input of the first AND gate 226. The third comparator 224 has its output further connected to a first input of a second AND gate 228. The delay element 225 also has its output connected to an input of a second inverter 229. The second inverter 229 has an output connected to a second input of the second AND gate 228. The second AND gate 228 has an output connected both to a first input of a third AND gate 230 and to a first input of a sixth AND gate 233. The first AND gate has an output connected both to a first input of a fourth AND gate 231 and to a first input of a fifth AND gate 232. The third AND gate 230 and the fifth AND gate 232 have their second inputs connected to the output of the second comparator 221. The fourth AND gate 231 and the sixth AND gate 233 have their second inputs connected to the output of the first comparator 220. The third AND gate 230 has an output connected to a first input and the fourth AND gate 231 has an output connected to a second input of a first OR gate 234. The first OR gate has an output connected to the UP input of an UP/DOWN counter 236. The fifth AND gate 232 has an output connected to a first input and the sixth AND gate 233 has an output connected to a second input of a second OR gate 235. The second OR gate 235 has an output connected to the DOWN input of an UP/DOWN counter 236. It is to be noted that in the variants described hereinbefore the functions of the control means 2 have been implemented in dedicated hardware. This is favorable in order to achieve short response times. In other variants the functions of the control means or parts thereof can be carried out by means of a suitably programmed general-purpose processor.

Figure 6:
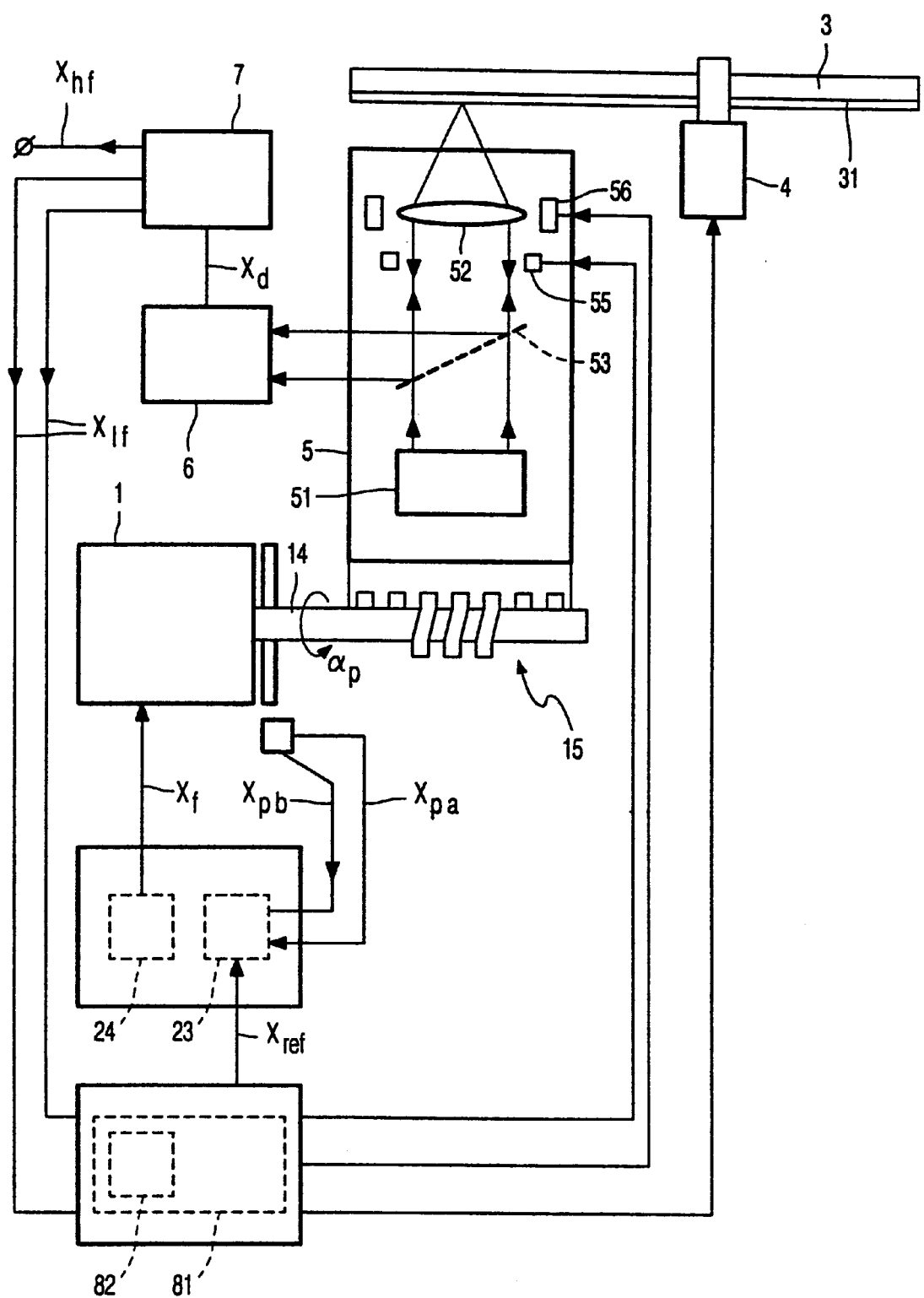
FIG. 6 shows a unit for writing data onto and/or reading data from a data carrier.

FIG. 6 shows diagrammatically a unit for writing data onto and/or reading data from a data carrier 3. The data carrier 3 shown records the data as an optical pattern. In the version shown herein the data carrier 3 has a radiation-sensitive layer 31, for example a radiation-sensitive dye layer or a phase change layer. The data carrier 3 is driven in a customary manner by a motor 4, as a result of which it is rotated about an axis. A write and/or read head is arranged opposite the data carrier to write and/or read information patterns on the data carrier 3.

In the version shown herein the write and/or read head 5 includes a radiation source 51, for example in the form of a solid-state laser. In another version the unit is intended for a magnetic data carrier and the write and/or read head has means for writing and/or reading magnetic patterns on the data carrier, for example a magnetic head.

The radial position of the head 5 relative to the data carrier 3 is controlled by a positioning mechanism. The head 5 and the data carrier 3 then respectively form a second part and a first part of a driving system. The driving system further includes a motor 1. The positioning mechanism may be constructed as an arm which is pivotable about an axis by means of the motor 1, the head being mounted on one end of the arm.

In the version described here the positioning mechanism takes the form of a slide which is translatable by means of the motor 1, a rotary movement of the shaft 14 of the motor 1 being converted into a translation of the head 5 by means of a rack and worm gear 15. The angle ($\alpha_p$) of the shaft 14 is consequently related to the instantaneous value of the radial position of the head 5 with respect to the data carrier 3. When information is read from or information is written onto the data carrier 3 the data carrier 3 is rotated and the head 5 is moved in a radial direction in such a manner that the head follows an information track of the data carrier 3 with a linear velocity. When information is written onto the data carrier 3 the laser generates a modulated laser beam which is projected onto the radiation-sensitive layer 31 of the data carrier 3 by means of the lens system 52 (shown diagrammatically). As a result of this, the radiation-sensitive layer 31 is subjected to optically detectable changes, for example in the degree of reflection from this layer 31. During reading the lens system 52 projects a laser of beam of comparatively low intensity onto the radiation-sensitive layer 31. Radiation reflected from the radiation-sensitive layer is subsequently imaged onto an optical detector 6 via the lens system 52 and via a semi-reflecting mirror 53. In response to this radiation the optical detector produces signals Xd. A signal processor 7 derives low-frequency signals Xlf from the detector signals, which low-frequency signals are important inter alia for controlling the head movement. One of the signals Xlf, for example, is an indication of the extent to which the beam coincides with a track to be written/read. Another signal is an indication of the extent to which the beam is in focus on the radiation-sensitive layer. Furthermore, the signal processor 7 derives high-frequency signals Xhf from the detector signals Xd. The high-frequency signals represent, for example, audio and/or video information. Such a signal processor is described, for example, in EP 508 522 hereby incorporated in whole by reference. Moreover, the signal processor may perform error detection and channel decoding.

Reference means 22 including a microprocessor 81 having a memory 82 derive a reference signal Xr from the low-frequency signals in a customary manner, which reference signal is a measure of the desired position of the read head. Control means 23, 24 derive a signal Xf for energizing the positioning mechanism 9 from the reference signal Xr and position signals Xpa, Xpb obtained from the positioning mechanism 9. For this purpose, the control means include means 23 and energizing means 24 as described with reference to FIGS. 1,2,4 and 5.

In the version described herein the read head 5 has a first actuator 56 which enables fine control of the position of the beam on the data carrier 3. The read head 5 further has a second actuator 55 for controlling the focussing of the laser beam.

The manner in which the reference signal Xr is generated depends on the mode of the apparatus. In a first mode in which information is read or written the position of the beam is determined in the first place by the first actuator 56. The positioning mechanism 9 can then move the head 5 gradually in order to minimize the average excursion of the first actuator 56. Furthermore, the positioning mechanism 9 can become operative as soon as the excursion of the first actuator 56 exceeds a predetermined limit as described in U.S. Pat. No. 5,321,676 hereby incorporated in whole by reference. In a second mode a search operation for a data carrier track to be read or written is effected. Usually, a large radial distance is covered for this purpose, the positioning mechanism 9 then playing an essential role. During the search operation a reciprocating movement can be imposed on the first actuator 56, as is described in U.S. Pat. No. 4,330,880 hereby incorporated in whole by reference. Thus, it is possible to achieve that the beam follows a track in periodically recurring time intervals during the search operation and thereby also read information during the search for a new track.

Obviously, a multitude of variants are conceivable to the expert without departing from the scope of the claims. In an embodiment of the apparatus in accordance with the invention the motor is, for example, a stepper motor having a first winding and a second winding which are 90° spaced apart, and the position signals are proportional to $\sin(\alpha)$ and $\cos(\alpha)$, where $\alpha$ is the angle occupied by the motor shaft. Controlling is possible by means of the error signal generating means shown in FIG. 2, in which Xe1 is an error signal and Xe2 is a further error signal. In that case each of the windings of the stepper motor has a driver which is controlled by a respective error signal.

The invention further relates to any novel characteristic feature and to any combination of novel characteristic features.

What is claimed is:

1. A control system comprising:
   a measurement system for generating a first and a second position signal, which position signals are a measure of an instantaneous value of the position of a second part of a driving system, which second part is to be positioned with respect to a first part of the driving system;
   error signal generating means for generating an error signal in response to a reference signal and the first and a second position signal, which reference signal is a measure of a desired value of the position, which error signal is a measure of the difference between the desired value and the instantaneous value of the position, which the error signal generating means derive weighting factors from the reference signal, for weighting the position signals with the weighting factors, and for determining a sum of the weighted position signals;

energizing means for energizing the motor in dependence on the error signal.

2. The system of claim 1, in which the position signals are periodic functions of the instantaneous value of an angle related to the position, the weighting factors being periodic functions of the reference signal.

3. The system of claim 2, in which error signal generating means determine a further sum from the weighted position signals, the sum and the further sum being periodic functions of the deviation between the instantaneous value and the desired value of the angle, which periodic functions are shifted in phase with respect to one another, and the error signal generating means being further adapted to determine a measure of the number of periods corresponding to the deviation between the instantaneous value and the desired value of the angle.

4. A method of controlling a motor in a driving system having a first part and a second part to be driven with respect to the first part by the motor, which method comprises the steps of:

generating a first and a second position signal which depends on the value of the position of the second part with respect to the first part;

generating a reference value which is a measure of the desired value of the position;

generating an error signal which is a measure of the difference between the instantaneous value and the desired value of the position;

energizing the motor in dependence on the error signal;

deriving weighting factors from the reference signal;

weighting the position signals with the weighting factor; and determining a sum of the weighted position signals.

5. The system of claim 1, in which the error signal generating means generate an error signal which in the case of a comparatively small difference between the instantaneous position and the desired position exhibits a comparatively fine quantization with respect to the quantization in the case of a comparatively large difference.

6. The system of claim 1, in which the error signal generating means generate an error signal which in the case of a comparatively small difference between the instantaneous position and the desired position exhibits a comparatively large variation with respect to the variation in the case of a comparatively large difference.

7. A driving system, comprising: a motor; a first part; a second part to be driven with respect to the first part by the motor; and a control system, including:

a measurement system for generating a first and a second position signal, which position signals are a measure of an instantaneous value of the position of a second part of a driving system, which second part is to be positioned with respect to a first part of the driving system;

error signal generating means for generating an error signal in response to a reference signal and the first and a second position signal, which reference signal is a measure of a desired value of the position, which error signal is a measure of the difference between the desired value and the instantaneous value of the position, which error signal generating means derive weighting factors from the reference signal, for weighting the position signals with the weighting factors, and for determining a sum of the weighted position signals; and energizing means for energizing the motor in dependence on the error signal.

8. An apparatus for storing and/or reproducing information, comprising:

a head for writing information onto an information carrier and/or for reading information stored on an information carrier; and a driving system for positioning the head with respect to the information carrier, including: a motor; a first part; a second part to be driven with respect to the first part by the motor; and a control system that includes:

a measurement system for generating a first and a second position signal, which position signals are a measure of an instantaneous value of the position of a second part of a driving system, which second part is to be positioned with respect to a first part of the driving system;

error signal generating means for generating an error signal in response to a reference signal and the first and a second position signal, which reference signal is a measure of a desired value of the position, which error signal is a measure of the difference between the desired value and the instantaneous value of the position, which error signal generating means derive weighting factors from the reference signal, for weighting the position signals with the weighting factors, and for determining a sum of the weighted position signals; and energizing means for energizing the motor in dependence on the error signal.

9. The control system of claim 1, in which:

the position signals are periodic functions of the instantaneous value of an angle related to the position, the weighting factors being periodic functions of the reference signal;

error signal generating means determine a further sum from the weighted position signals, the sum and the further sum being periodic functions of the deviation between the instantaneous value and the desired value of the angle, which periodic functions are shifted in phase with respect to one another, and the error signal generating means being further adapted to determine a measure of the number of periods corresponding to the deviation between the instantaneous value and the desired value of the angle;

the error signal generating means generate an error signal which in the case of a comparatively small difference between the instantaneous position and the desired position exhibits a comparatively fine quantization with respect to the quantization in the case of a comparatively large difference;

the error signal generating means generate an error signal which in the case of a comparatively small difference between the instantaneous position and the desired position exhibits a comparatively large variation with respect to the variation in the case of a comparatively large difference.

10. The driving system of claim 7, in which:

the position signals are periodic functions of the instantaneous value of an angle related to the position, the weighting factors being periodic functions of the reference signal;

error signal generating means determine a further sum from the weighted position signals, the sum and the further sum being periodic functions of the deviation between the instantaneous value and the desired value of the angle, which periodic functions are shifted in phase with respect to one another, and the error signal generating means being further adapted to determine a measure of the number of periods corresponding to the deviation between the instantaneous value and the desired value of the angle;

the error signal generating means generate an error signal which in the case of a comparatively small difference between the instantaneous position and the desired position exhibits a comparatively fine quantization with respect to the quantization in the case of a comparatively large difference;

the error signal generating means generate an error signal which in the case of a comparatively small difference between the instantaneous position and the desired position exhibits a comparatively large variation with respect to the variation in the case of a comparatively large difference.

11. The apparatus of claim 8, in which:

the position signals are periodic functions of the instantaneous value of an angle related to the position, the weighting factors being periodic functions of the reference signal;

error signal generating means determine a further sum from the weighted position signals, the sum and the further sum being periodic functions of the deviation between the instantaneous value and the desired value of the angle, which periodic functions are shifted in phase with respect to one another, and the error signal generating means being further adapted to determine a measure of the number of periods corresponding to the deviation between the instantaneous value and the desired value of the angle;

the error signal generating means generate an error signal which in the case of a comparatively small difference between the instantaneous position and the desired position exhibits a comparatively fine quantization with respect to the quantization in the case of a comparatively large difference;

the error signal generating means generate an error signal which in the case of a comparatively small difference between the instantaneous position and the desired position exhibits a comparatively large variation with respect to the variation in the case of a comparatively large difference.

12. The method of claim 4, in which:

the position signals are periodic functions of the instantaneous value of an angle related to the position, the weighting factors being periodic functions of the reference signal;

generating the error signal includes determining a further sum from the weighted position signals, the sum and the further sum being periodic functions of the deviation between the instantaneous value and the desired value of the angle, which periodic functions are shifted in phase with respect to one another, and generating the error signal includes determining a measure of the number of periods corresponding to the deviation between the instantaneous value and the desired value of the angle;

in the case of a comparatively small difference between the instantaneous position and the desired position, the error signal exhibits a comparatively fine quantization with respect to the quantization in the case of a comparatively large difference;

in the case of a comparatively small difference between the instantaneous position and the desired position, the error signal exhibits a comparatively large variation with respect to the variation in the case of a comparatively large difference.

* * * * *